United States Patent [19]

Duhame

[11] 4,433,274

[45] Feb. 21, 1984

[54] HOME SECURITY AND GARAGE DOOR OPERATOR SYSTEM

[76] Inventor: Dean C. Duhame, 19836 Jerome, Apt. 238, Roseville, Mich. 48066

[21] Appl. No.: 287,336

[22] Filed: Jul. 27, 1981

Related U.S. Application Data

[62] Division of Ser. No. 140,045, Apr. 14, 1980, Pat. No. 4,360,801.

[51] Int. Cl.[3] ........................ H02H 7/085

[52] U.S. Cl. ........................ 318/283; 318/16; 318/471; 340/628; 49/31

[58] Field of Search ........................ 49/13-14, 49/31, 141, 199; 318/16, 283-286, 445, 450, 466-468, 471-473; 340/627, 628, 629, 630, 634

[56] References Cited

U.S. PATENT DOCUMENTS

| | | | |
|---|---|---|---|
| 2,558,032 | 6/1951 | Andrews | 318/472 |
| 4,048,630 | 9/1977 | Deming et al. | 200/113 |
| 4,054,008 | 10/1977 | Phillips | 49/141 |
| 4,110,675 | 8/1978 | Wisher | 318/284 |
| 4,234,833 | 11/1980 | Barrett | 318/282 |
| 4,263,536 | 4/1981 | Lee et al. | 318/468 |
| 4,301,396 | 11/1981 | Baurke | 318/471 |
| 4,304,070 | 12/1981 | Musacchia | 49/141 |
| 4,394,607 | 7/1983 | Lamirande | 318/471 |

*Primary Examiner*—J. V. Truhe
*Assistant Examiner*—A. Evans
*Attorney, Agent, or Firm*—Krass, Young & Schivley

[57] ABSTRACT

A home security and garage door operator system includes a gas sensor for detecting the level of toxic gas in the garage. When the gas level exceeds a predetermined threshold the garage door is automatically opened. Lock out circuitry is provided for preventing the door from being accidentally closed as long as the gas sensor detects an excessive level of toxic gas in the garage. A two button transmitter is used to sequentially close the garage door and set a security alarm subsystem. Warning devices are activated if the security alarm is attempted to be set without the garage door and windows in the home being closed. Once the security alarm has been set, the lock out circuitry also disables the garage door motor control circuitry until the security alarm is first deactivated. The transmitter generates a digital pulse train according to a preselected code, with the operation of the dual buttons changing the state of a particular control bit in the pulse train. A central control module in the garage includes a receiver with channel monitoring circuitry designed to detect the state of the control bit to initiate different functions, for example, the setting of the security alarm and the actuation of the garage door. The system further includes a heat sensor in the central control module and advantageously uses a line carrier to transmit status information regarding the monitored parameters to a remote module in the home. A maximum run timer and motor overload protection for the motor control circuitry are also disclosed.

1 Claim, 9 Drawing Figures

70
8VDC
200
5VDC
N1
R10
R12
R14
R16
N2
72
C10
76
8VDC
R61
P1
D1
R18
78
C12
74
R20
R19
280
282
284
208
96
206
J K Q
CLK
Q̄
S R
246
105
P13
110
C29
R61
101
C61
R31
204
112
202
P10
R63
106
82
R21
80
R25
R23
102, 140
222
224
104
100
106
108
R65
R34
C20
226
306
R27
R29
D3
R
VT
TH
OUT
TR
DIS
GND
VC
300
302
C11
C13

TO LIGHT 27
TO MOTOR CLOSE
TO MOTOR OPEN
P51
FULL CLOSED
FULL OPEN
S1
18
219
94
132
286
212
214
208
210
216
217
218
220
221
240
242
244
260
262
264
280
308
326
350
352
353
354
Q1
Q2
Q4
R30
R32
R33
R40
R47
R49
R51
R53
R55
R59
C18
C21
C35
D2
D9
J
K
CLK
S
R
Q
P

HOME SECURITY AND GARAGE DOOR OPERATOR SYSTEM

This application is a division of application Ser. No. 140,045 filed Apr. 14, 1980 now U.S. Pat. No. 4,360,801.

BACKGROUND OF THE INVENTION

This invention relates to remote controlled load actuating systems. More particularly, it involves a combination automatic garage door operator and home security system.

Remote actuation of garage door operators and similar loads have been accomplished traditionally by means of a radio control system wherein transmitters and receivers are matched to one another by frequency selection. An inherent disadvantage of this approach is the limited number of available carrier frequencies and the possibility of a match between transmitters and receivers belonging to different persons.

With an increasing awareness of such a potential security problem, the recent trend in providing remotely actuated garage door operators is to provide the owner with the capability of selecting his own personalized code in the transmitter and receiver sections. Many of the recent systems employ digital coding techniques in which the owner selects a particular combination of switches to set the code. Representative examples of known garage door operator systems are disclosed in U.S. Pat. No. 4,305,060 U.S. Pat. No. 4,141,010 to Umpleby et al; U.S. Pat. No. 3,906,348 to Wilmott; and U.S. Pat. No. 4,037,201 to Wilmott. U.S. Pat. No. 4,141.010 and U.S. Ser. No. 015,495 are hereby incorporated by reference.

It is of course well known that internal combustion engines such as those used in automobiles generate carbon monoxide gas. Carbon monoxide gas is poisonous and high levels of this gas can lead to serious injury and even death if consumed by human beings and animals. Several attempts have been made to monitor the presence of toxic gas and provide warning signals when a dangerous level has been reached. U.S. Pat. No. 3,418,914 to Finken discloses an automobile ventilation technique in which a temperature responsive impedence bridge compares the thermal conductivity of cabin atmosphere with that of a reference environment in order to monitor the cabin for abnormal carbon dioxide concentrations. The output signal from the bridge is used to activate a warning device and/or a ventilating system. U.S. Pat. No. 3,826,180 to Hayashi similarly discloses a ventilator wherein an electronic circuit is actuated when a detecting element senses the existence of smoke or gas, with a fan being automatically actuated to expell the smoke or gas from the environment.

None of the prior art, however, suggests the utilization of a toxic gas sensor in combination with an automatic garage door operator, such that the garage door is automatically opened when a dangerous level of toxic gas is detected. More importantly, the unique environmental conditions that are experienced in normal use of a garage makes the utilization of prior art sensing circuitry impractical. For example, a certain amount of toxic gas is generated when the automobile is initially started up in the garage. Once the user has backed out of the garage and shut the door, the sensor may be activated due to the increased concentration of the toxic gas. This may result in the undersirable opening of the garage door after the user has left the premises, thereby opening the way for unwanted intruders.

Home security systems utilizing burglar alarms have gained increasing popularity in recent years. They generally employ switches or other detector devices to monitor the position of building entrances such as doors and windows. When the alarm system is set, the tripping of the switches will energize a warning device. Unfortunately, the alarm system must be actuated or set locally, primarily by throwing a switch on the control unit located within the building. Accordingly, there is no convenient way of sensing the unauthorized instrusion into the building via the garage door since the burglar alarm must be set before leaving the premises. If the garage door was monitored by such alarm systems, the opening of the garage door so that the user could leave the garage would set off the warning devices.

SUMMARY OF THE INVENTION

According to the broadest aspects of this invention, toxic gas detector means are utilized for sensing the level of toxic gases such as carbon monoxide in the garage. Actuator means automatically open the garage door in response to a predetermined level of toxic gas as sensed by the detector means. Preferably, the toxic gas detector uses a semiconductor device as part of a voltage divider network. The resistance of the semiconductor device decreases with increasing concentrations of toxic gas. When the output of the voltage divider network increases beyond a selectable sensitivity threshold level, a comparator is tripped and provides an output signal to energize the garage door actuating mechanism. The detector means advantageously utilizes a toxicity detector circuit which is coupled between the semiconductor device and the comparator. The toxicity detector circuitry serves to delay the tripping of the comparator for a period of time which is a function of the concentration of the toxic gas in the garage. Accordingly, the garage door is not prematurely actuated due to the toxic gas created when the car is started or by gas remaining in the garage when the car has departed and the door closed.

According to another feature of this invention, lock out means in the control circuitry prevent the door actuator means from being reenergized as long as the sensor circuitry detects a truly dangerous level of toxic gas in the garage. Additionally, means are provided to monitor the proper operation of the sensing element and its associated power supply, with this feature of the invention providing a warning signal if improper operation is detected. Further, the sensitivity threshold level of the comparator is temporarily overridden by a secondary threshold level during warm up of the system to counteract for abnormal response characteristics of the sensing element during initialization.

The present invention is preferably employed as part of a home security system having a central control module in the garage, a transmitter carried by the user in the automobile, and a remote module in the home. The system includes a security alarm subsystem having portal sensing elements such as switches mounted on doors and windows in the home, as well as for detecting the position of the garage door. The transmitter preferably includes at least two manually operable control switches for selecting particular functions to be initiated by the central control module. In the preferred embodiment, the transmitter generates a digital pulse train according to a preselected setting of a plurality of code select switches. The pulse train includes a multibit security code portion and at least one control bit which is not affected by the code select switches. Instead, the pressing of the buttons on the transmitter changes the state of the control bit in the pulse train. A receiver portion in the central control module includes a plurality of code select switches which define the security code for the receiving end of the system. No functions will be performed by the central control module unless the security codes of the transmitter and receiver match. Channel monitoring means in the central control module detects the state of the control bit in the pulse train and generates selected output signals to initiate different functions depending on the state of the control bit. In particular, when one button on the transmitter is pushed, the control bit assumes one state which in turn is sensed by the channel monitor to initiate the garage door actuator. The state of the control bit will change when the other button is pushed and will set the security alarm system provided that all of the portal switches indicate a closed position of the building entrances. Once the security alarm is set, further activation of the garage door actuator is prevented by the lock out circuitry until the security alarm is deactivated. This prevents the garage door from being opened by unauthorized, albeit correctly coded transmissions.

Further advantageous features of this invention include a line carrier system for transmitting certain status information to the remote module in the home. The remote module preferably includes an audible alarm. Additionally, the central control module may include a heat sensor. The line carrier in the central control module transmits the status information over the internal house wiring and will activate alarm or indication devices in the remote module. Preferably, warning devices in the remote module are energized at different repetition rates depending upon the status information. According to still another feature of this invention, the setting of the security code in the receiver simultaneously defines an address code for the line carrier. The remote module further includes a plurality of switches which are manually set to correspond to the address code of the line carrier.

The door actuator circuitry further includes a maximum run timer which controls the maximum allowable time period in which the garage door must close. Motor overload protector circuitry is advantageously utilized to temporarily disable only the door actuator portion of the system when a malfunction is detected.

BRIEF DESCRIPTION OF THE DRAWINGS

These and other advantages of the invention will become apparent upon reading the following specification and by reference to the drawings in which.

DESCRIPTION OF THE PREFERRED EMBODIMENT

Figures 1, 2:
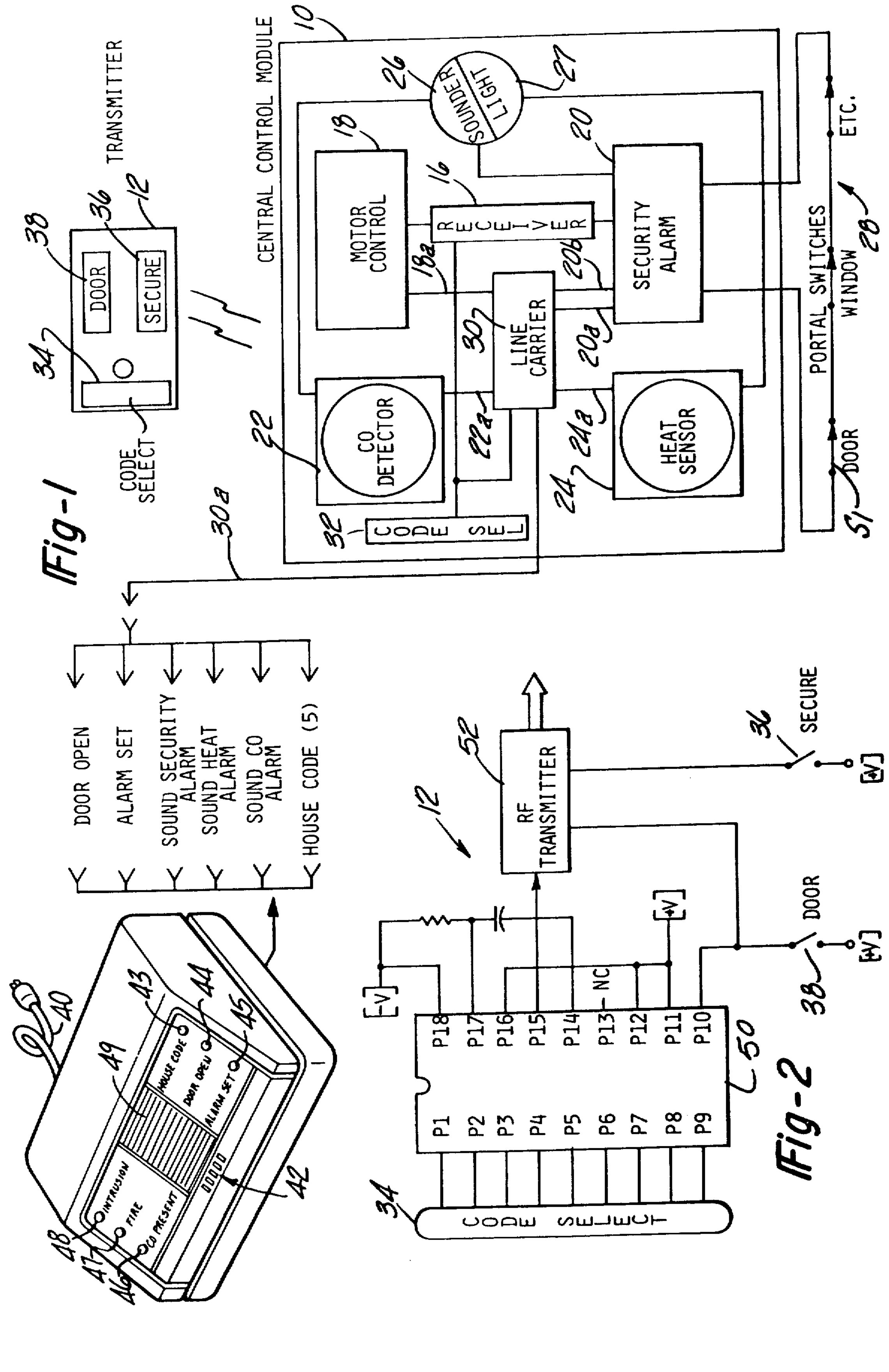
FIG. 1 is a block diagram of the preferred embodiment of the system of this invention.
FIG. 2 is a schematic diagram of the transmitter portion of the system.

Referring to FIG. 1, the present invention utilizes three main components: the central control module 10 which is mounted in the garage; a portable transmitter 12 which is carried by the user in his automobile; and a remote module 14 which is located within the home generally in the user's bedroom. Central control module 10 generally includes a receiver 16 which receives and decodes the transmitted signals and, in turn, initiates motor control circuitry 18 which controls the positioning of the garage door and the setting/deactivation of security alarm circuitry 20. Carbon monoxide detector 22 and heat sensor 24, as well as security alarm 20, are coupled to an audible warning sounder 26 and light 27. Sounder 26 will be activated at different repetition rates depending upon the detected condition. For example, if portal switches 28 or door switches S1 are tripped sounder will be activated at one repetition rate, whereas the frequency thereof will vary if gas detector 22 or heat sensor 24 detects a dangerous condition. Line carrier 30 transmits status information over the house wiring to remote module 14. Code selecting devices 32 simultaneously define a security code for receiver 16 and an address code for line carrier 30.

Transmitter 12 similarly includes code selecting devices 34 which define the security code portion of the transmitted pulse train. Two manually operable buttons 36 and 38 on the transmitter 12 serve to control the security alarm system 20 and motor control circuitry 18, respectively.

Remote module 14 includes a wall plug 40 which engages the electrical wiring that is commonly used in the house. Five code select switches 42 define the address code for the remote module. Light emitting diodes 43-48 provide visual indications that the correct address or house code is selected, the garage door is open, the security alarm is set carbon monoxide is detected, fire is detected, and an intrusion is detected, respectively. Remote module 14 communicates with line carrier 30 in the central module and receives the following status information: (1) whether the garage door is open; (2) whether the security alarm has been set; (3) whether the security alarm has been activated; (4) whether the heat sensor has been activated; and (5) whether the carbon monoxide detector has been activated. A five bit signal defining the address or house code is also received from the line carrier 30 by the remote module 14.

Turning to FIG. 2, transmitter 12 is a modified version of the transmitter more fully disclosed in U.S. Pat. No. 4,141,010 and U.S. Pat. No. 4,305,060 which are noted above and hereby incorporated by reference. Briefly, the transmitter 12 employs a counter (not shown) within integrated circuit chip 50 which provides a ten bit digital pulse train followed by a blank or synchronization time period. The first nine bits will have varying widths depending upon the position of the first nine of the manually actuable two position switches making up code select portions 34. If a particular code select switch is closed the output pulse will have a wider width than if the switch is in an open position. The code select switch for the tenth bit has been disconnected. The door button 38 is coupled to P10 of chip 50 and to the power supply input of RF transmitter 52. When the door switch 38 is pressed, transmitter 52 transmits a pulse train such as that shown in FIG. 6(B).

It should be noted that the tenth bit position (hereinafter referred to as the control bit) is relatively wide. This is due to the fact that the pressing of door button 38 supplies a voltage to pin P10 simulating a closed switch position. In comparison, when the security alarm switch 36 is pressed, RF transmitter 52 transmits a pulse train such as that shown in FIG. 6(A). The control bit is narrower than the control bit when the door switch 38 is pressed due to the fact that the input P10 to chip 50 now has no voltage applied to it thereby simulating a switch open position.

Figure 3:
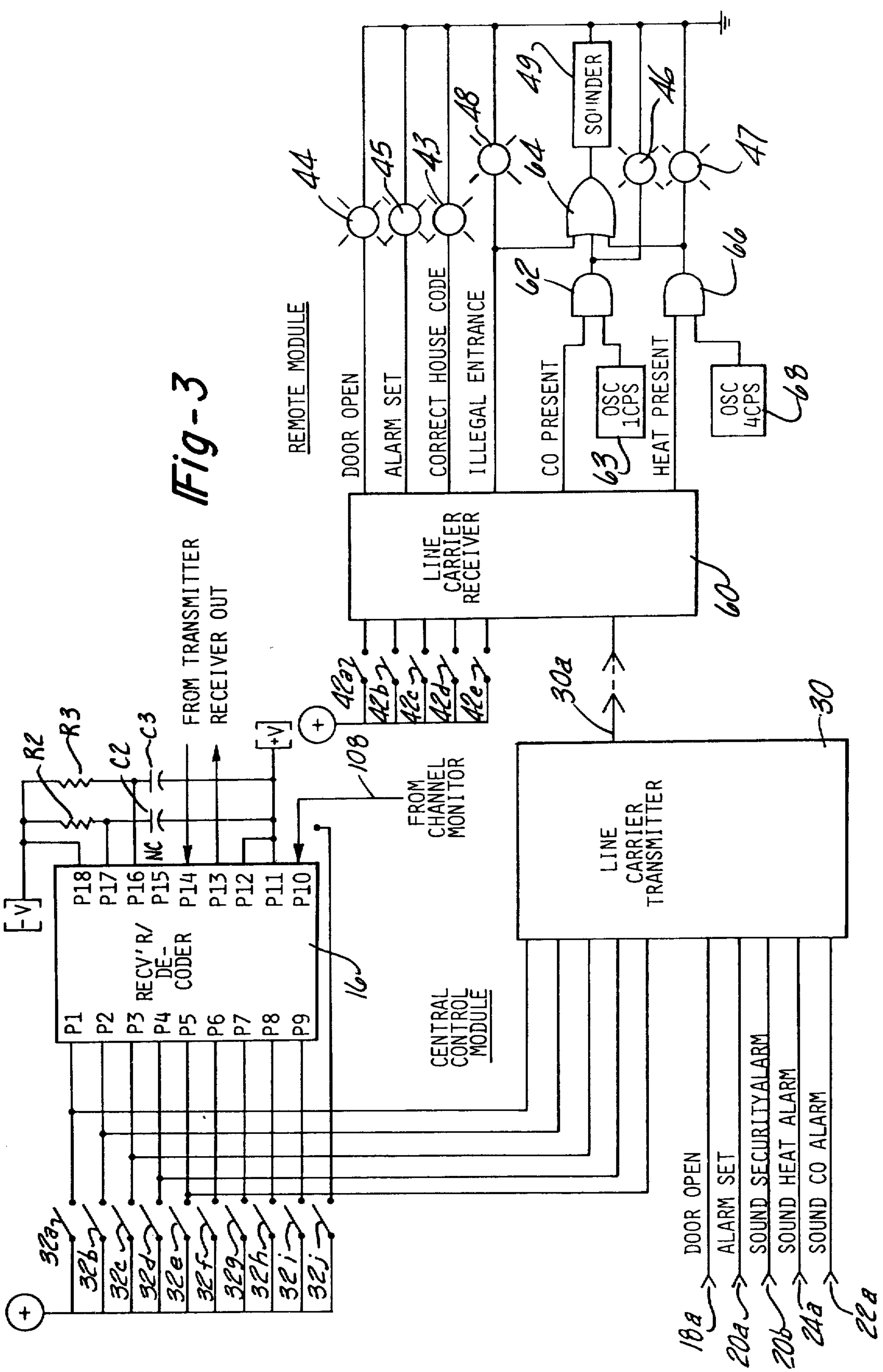
FIG. 3 is a block diagram of portions of the central control module and remote module of the system.

Similarly, the receiver 16 of FIG. 3 is a modified version of the receiver/decoder of the above referenced publications. Briefly, receiver 16 receives the pulse train from transmitter 12 and compares each pulse with a corresponding pulse in a locally generated pulse train. The width of the first nine pulses of the local pulse train are determined by the position of switches 32*a*–32*i*. The tenth switch 32*j* has been disconnected. Pin P10 instead receives an oscillating signal from channel monitoring circuitry to be later more fully described herein. The input to pin P10 thus changes from a logical one level corresponding with a closed switch position to a logical zero level corresponding to an open switch position. If the received pulse train corresponds with the locally generated pulse train, receiver 16 provides a high or logical one level on the "Receiver Out" pin P13 indicating a match.

According to a feature of this invention, the same switches which define the security code for transmitter 12-receiver 16 communications, simultaneously define the house or address code for line carrier 30-remote module 14 communications. Line carrier transmitter 30 operates substantially indentical to the transmitter 12. However, the transmitted pulse train contains both address and data information. Five of the ten bit pulses defining the address code will have their widths dependent upon the positions of switches 32*a*–32*e*. It is important to note that the address code for line carrier 30 is automatically and simultaneously set when switches 32*a*–32*e* are selected for the purposes of defining the security code for receiver 16. The widths of the other five bits in the line carrier transmitted pulse trains are determined by the status of the monitoring devices within the central control module 10. For example, if motor control circuitry 18 determines that the garage door is in an open position it will provide a logical one level on line 18*a* which simulates one of the normally used two position code select switches being closed. Consequently, of the ten bit positions in the line carrier pulse train on line 30*a*, five will contain address information and five bits will contain data information. In the preferred embodiment, this pulse train is amplitude modulated in a known manner and carried over the house wiring to the receiver portion 60 of the remote module 14.

Line carrier receiver 60 operates in substantially the same manner as receiver 16. However, only five bits of the internally generated local pulse train are utilized for comparison with the corresponding bits in the line carrier transmitted pulse train defining the address code. The address code is defined in receiver 60 by the positions of switches 42*a*–42*e*. If the widths of the pulses defining the address codes coincide, receiver 60 will provide an output signal causing LED 44 to be activated thereby indicating that the selected house code in line carrier receiver 60 corresponds with that of line carrier transmitter 30. If a given state of the status information in the data portion of the received pulse train is detected, appropriate warning devices are activated by receiver 60. For example, if the carbon monoxide detector 22 has been activated, receiver 60 will generate an appropriate signal on the line labled "CO Present" which is ANDed by gate 62 with an oscillator network 63 to activate sounder 49 and LED 46 at a given repetition rate. OR gate 64 will similarly be activated in the case of an "Illegal Entrance" or "Heat Present" signal being detected. Note that the "Heat Present" condition will cause sounder 49 and its associated LED 47 to be activated at a much faster repetition rate due to the ANDing of the four cycle per second oscillator 68 through AND gate 66. Further details of the line carrier transmission system may be obtained by reference to concurrently filed U.S. patent application Ser. No. 140,044, entitled "Data Communication System For Activating Remote Loads" by Apple et al which is also hereby incorporated by reference.

Figure 4:
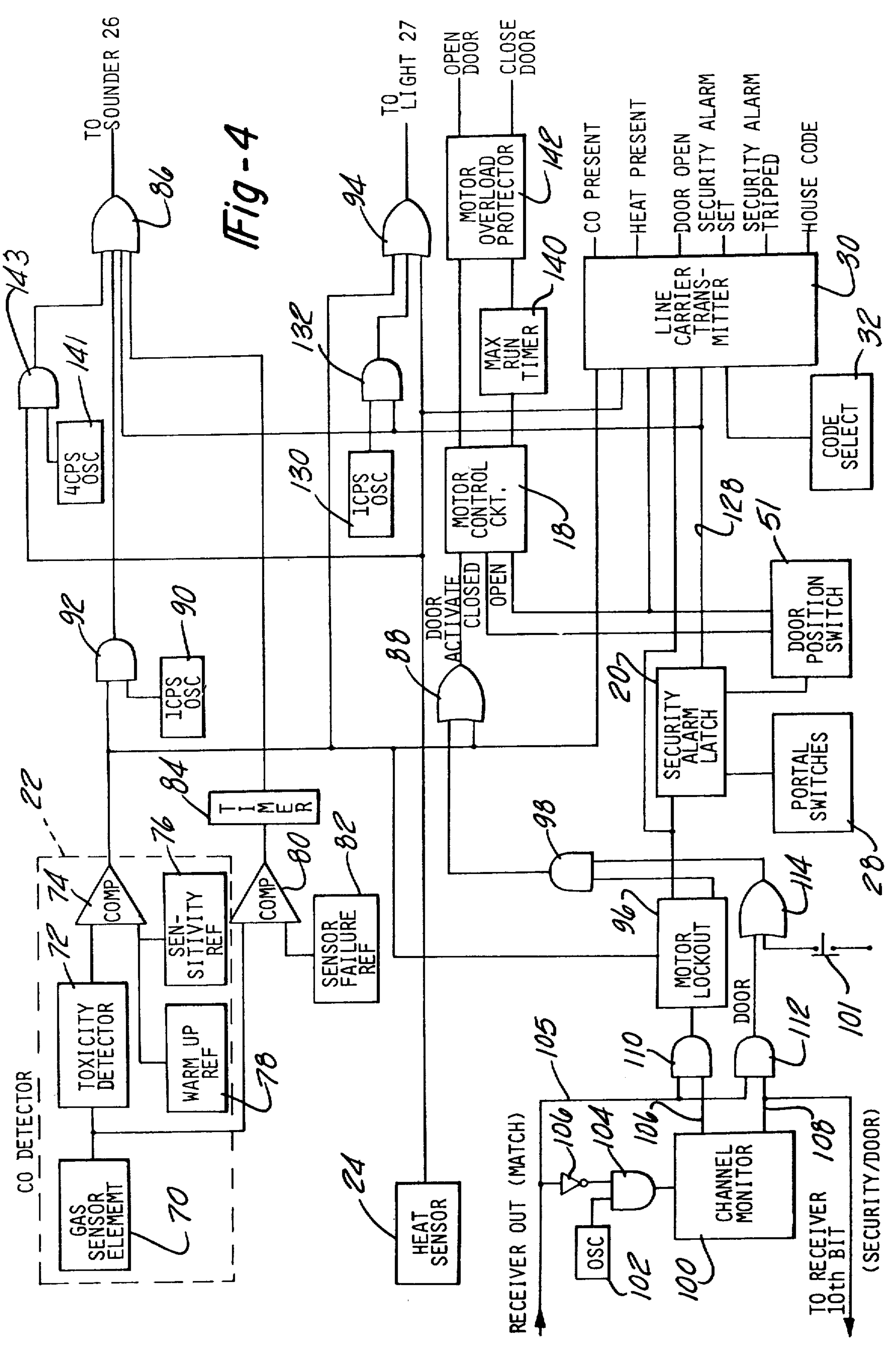
FIG. 4 is a block diagram of the circuitry in the central control module.

Turning now to FIG. 4, there is shown a block diagram of the major functional components of the central control module 10 with the exception of receiver 16 which has previously been described.

The carbon monoxide detector 22 utilizes a gas sensor element 70 whose electrical characteristics are a function of the level of toxic gas in the nearby environment. The output of gas sensor element 70 is coupled through a toxicity detector circuit 72 to one input of comparator 74. Toxicity detector circuit 72 monitors the electrical characteristics of sensor element 70 and generates a modified electrical output to comparator 74 which is not merely a function of the instantaneous level of toxic gas, but instead is a function of the concentration of the toxic gas level per unit time in the environment. In the preferred embodiment, the toxicity detector circuit 72 consists of a resistor-capacitor network whose RC time constant serves to delay the output of sensor element 70 for selected periods of time. The time delay will be a function of both the level of toxic gas in the environment and the time period in which the toxic gas is detected. The other input to comparator 74 is connected to a sensitivity reference voltage level generated by circuit 76. Once the output of toxicity detector circuit 72 exceeds the sensitivity voltage level supplied by circuitry 76, comparator 74 will provide a logical one or high output signal. According to a feature of this invention, a warm-up reference circuit 78 is provided to override the sensitivity circuit 76 during periods of system initialization. Typically used gas sensor elements are not stable when power is first applied to the system. Accordingly, comparator 74 may be prematurely activated by the unstable operating characteristics of sensor element 70. Warm-up reference circuitry 78 provides a secondary reference to comparator 74 which is substantially higher than the sensitivity reference level supplied by circuitry 76 in normal operation. Upon initialization, warm-up reference 78 will override the reference level supplied by circuitry 76. However, after a predetermined time delay, the warm-up reference level will decay such that the sensitivity reference supplied by circuitry 76 will determine the system's overall sensitivity.

According to still another feature of this invention, provision is made for automatically detecting the failure of sensor element 70 and its associated power supply. Comparator 80 compares the output of sensor element 70 with a sensor failure reference supplied by circuitry 82. If the comparison indicates improper device operation, the output of comparator 80 will activate a timer 84 whose output is coupled to sounder 26 through OR gate 86. The output frequency of timer 84 determines the repetition rate of sounder 26.

Referring back to the carbon monoxide detector 22, if the output of comparator 74 indicates a dangerous toxic gas level, its logical one output signal will activate motor control circuitry 18 through OR gate 88 to automatically open the garage door. Simultaneously, sounder 26 will be activated at a repetition rate determined by the one cycle per second oscillator network 90 coupled to AND gate 92. Additionally, light 27 coupled to central control module 10 will be energized via the operation of OR gate 94.

According to another feature of this invention, once the garage door is placed in an open position, the motor control circuitry 18 is disabled such that the door cannot be prematurely closed as long as there is a dangerous level of carbon monoxide in the garage. Briefly, this is accomplished through the provision of a motor lock out circuit 96. The output of motor lock out circuit 96 disables AND gate 98 and prevents motor control circuitry 18 from being activated even if the interior push button switch 101 in the garage is pushed or the correct door operation code from the transmitter 12 is subsequently received.

The output from detector circuitry 22 causes line carrier 30 to transmit an appropriate data signal to the remote module 14 so that sounder 49 and LED 46 will be energized.

Figure 6:
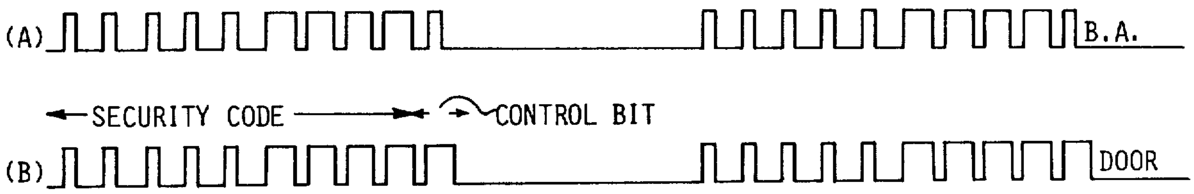
FIG. 6 illustrates examples of digital pulse trains generated by the transmitter.

Channel monitor 100 cooperates with receiver 16 to detect the state of the control bit in the transmitted pulse train. An oscillator 102 coupled to an input of the channel monitor 100 through AND gate 104 causes the signal level on outputs 106 and 108 of monitor 100 to oscillate back and forth. Line 108 is coupled back to pin P10 of receiver 16 as shown in FIG. 3. As noted before, this will cause the tenth bit of the locally generated code to alternately generate pulse trains in which the width of the tenth pulse is varied as shown in FIGS. 6(A) and 6(B). Assuming that the transmitted pulse train corresponds with that shown in FIG. 6A, the receiver 16 will provide a logical one signal on pin P13 labled "Receiver Out". When this match is detected AND gate 104 (FIG. 4) is disabled via inverter 106 thereby locking the state of channel monitor 100 in its current state, i.e. with output line 108 low and output line 106 high. The combination of the logical one "Receiver Out" signal and the high signal state on line 106 enables AND gate 110. Conversely, if channel monitor output line 108 is in a logical one state and the transmitted pulse train corresponds to that shown in FIG. 6B, AND gate 112 will be enabled. This causes OR gate 114 to enable gate 98 if the motor lock out circuitry 96 is in an appropriate state. As noted before, the activation of the carbon monoxide detector 22 will cause the output lines of motor lock out circuitry 96 to disable gate 98 such that the door cannot be closed. Similarly, the pressing of the secure switch 36 on transmitter 12 will cause motor lock out circuitry 96 to disable AND gate 98 thereby preventing further door actuation.

In normal operational procedure, the user would first press the door button 38 on transmitter 12 after backing out of the garage thereby causing the door to be closed. The position of the garage door is sensed by switch S1 in a conventional manner. Once the door is closed, the user would press the security alarm button 36 on transmitter 12. This will set the motor lock out control circuitry 96 to disable gate 98 and prevent the door motor control circuitry 18 from being energized until the security circuitry 20 is deactivated by again pressing secure button 36. If the portal switches 28 and door position switch S1 indicates that the building entrances are all closed, the security circuitry 20 will be set when button 36 is first pressed and no warning devices will be activated. Line carrier 30 will then provide a data signal to remote module 14 thereby lighting LED 48 indicating that the security system has been set. If the security system is attempted to be set when either of the portal switches 28 or door position switch S1 indicate that an entranceway is open, various warning devices will be activated. This will indicate to the user that he should close all of the doors and windows before leaving the premises and setting the security system. Similarly, the subsequent activation of the portal switches 28 or door position switch S1 after the security system has been properly set will cause the warning devices to be energized. The activation of the security circuitry will generate an output on line 128. The high output level on line 128 causes several things to happen. First, it will activate OR gate 86 to activate sounder 26. Second, it cooperates with a one cycle per second oscillator 130 to enable AND gate 132 and OR gate 94 causing light 27 to flash. Thirdly, it causes line carrier 30 to generate a "Security Alarm Tripped" signal to remote module 14.

The system of the present invention further includes a heat sensor 24 for monitoring the temperature level within the garage. If activated, heat sensor 24 cooperates with a four cycle per second oscillator 141 to enable AND gate 143 and OR gate 86 thereby activating sounder 26 at the given repetition rate. Additionally, the activation of heat sensor 24 will turn on light 27 via OR gate 94 and cause a line carrier transmission.

The door actuator portion of the central control module 10 further includes a maximum run timer 140 which controls the maximum allowable amount of time for the door to close. Additionally, motor overload protection circuitry 142 removes power only from motor associated control devices when an overload condition is detected. When the proper operating conditions are resumed, power is restored to the motor control devices. Thus, motor overload protection circuitry 142 only deactivates selected portions of system 10 during a motor control malfunction and leaves the remaining system components in a fully operational state.

FIG. 5 shows the details of the circuitry comprising the functional blocks previously described in connection with FIG. 4. To the extent possible, the components making up the functional blocks of FIG. 4 are encompassed by dotted lines in FIG. 5. It should be understood that the particular logic gates shown in FIG. 4 will not necessarily correspond with those utilized in the detailed logic of FIG. 5 since the purpose of FIG. 4 was to show merely the general sequence of logical operation of the system. It therefore follows that the present invention is not merely limited to the details which will now be described but may be implemented in wide variety of manners. In view of the previous description and the details of the component by component interconnection shown in FIG. 5, it is not necessary to reiterate the isolated function and interconnection of each component comprising the system. Instead, one skilled in the art will gain more appreciation of the scope of this invention by way of a specific example of the system operation which will now be discussed.

The carbon monoxide detector 22 (FIG. 5B) utilizes a semiconductor sensing element 200. Sensing element 200 in this embodiment is manufactured by Figaro Engineering, Inc. of Osaka, Japan and distributed under the name Figaro Gas Sensor TGS #812. Briefly, sensor 200 is a sintered bulk semiconductor composed mainly of tin dioxide whose resistance decreases with an increasing level of toxic gas. Sensor 200 utilizes a heat coil for maintaining proper operational conditions. Regulated five volt DC power supply is coupled to the heater coil of sensor 200. The input of sensor 200 is tied to a position voltage supply. The output of sensor 200 is connected into a voltage divider network consisting of resistors R10 and R12. A thermistor element R14 is used for temperature compensation purposes. Thus, when sensor 200 is in a stable condition after a preliminary warm-up period, an increase of toxic gas will cause node NL to rise in voltage level due to the increasing amount of current flowing through sensing element 200.

The toxicity detector 72 in this example is made up of a 100K resistor R16 and 100 microfarad capacitor C10. The output of toxicity detector circuit 72 is coupled to the noninverting input of comparator 74. The sensitivity level of the carbon monoxide detector circuitry 22 is determined by the setting of potentiometer P1 which is part of a voltage divider network along with resistor R18 and R61. Resistor R61 limits the minimum sensitivity reference to which potentiometer P1 can adjust. This eliminates possible disability of the sensor completely due to sensitivity level adjustment error. An eight volt regulator DC supply is coupled to potentiometer P1. The output of the sensitivity reference circuitry 76 is coupled to the inverting input of comparator 74. Under steady state operating conditions this output defines the sensitivity threshold level. However, during initialization the sensor element 200 tends to have a very low resistance and would normally trip comparator 74 thereby falsely indicating a dangerous level of toxic gas. According to one provision of the present invention, warm-up circuitry 78 overrides the sensitivity reference circuitry 76 and provides a much higher reference level to the inverting input of comparator 74. In the preferred embodiment, this is accomplished by way of a resistor-capacitor network comprised of resistor R20 and capacitor C12. Hence, for a predetermined period of time determined by the RC time constant of circuitry 78, the inverting input will be above the normal sensitivity level until the sensor element 200 has sufficient time to reach its steady state operating conditions.

In our example, assume the door is fully closed and that the user has entered the garage and pushed the internal push button 101 to open the garage door. The activation of button 101 engages OR gate 202 which in turn enables one input to AND gate 204. The outer input to gate 204 is the high Q output of a JK flip flop 206 which has previously been set in the appropriate logic state via channel monitor 100 and AND gate 110. The logical one output of gate 204 is coupled over line 208 to one input of AND gate 210 (FIG. 5C) as well as to the clock input of flip flop 212. AND gate 352 whose output is now in a logic low state causes the output of inverter 353 to go to a logic high state thus enabling the input and thus the output of AND gate 210. OR gate 242 sets the Q output of flip flop 212 to a high logic state and decision gate 211 resets the Q output of flip flop 214 via OR gate 244. After approximately a 100 millisecond delay caused by the RC time constant of resistor R30 and capacitor C18, AND gate 216 will be enabled. Note that AND gate 216 has several inputs in which a logical true condition must all be met for it to be enabled. One of the other inputs is from the Q output of flip flop 212. The remaining input is coupled to the door position switch S1. With the garage in a fully closed position input line 218 will be in a logical high condition. The enabling of AND gate 216 causes transistor Q1 to conduct thereby energizing relay 220 which causes the motor 322 (FIG. 5D) to be actuated in a particular direction causing the door to open. Once the door is fully open gate 216 will be disabled since the contact of switch S1 will be grounded thereby causing line 218 to go low.

It should be appreciated that AND gates 211 and 213 (FIG. 5C) control the state of flip flop 214 which, in turn, controls whether the motor is going to drive in the open or closed direction. The output of AND gate 210 will be enabled whenever switch S1 is in the full closed or full open position and a motor actuating signal over line 208 is received. The output of AND gate 210 is commonly coupled to inputs of decision gates 211 and 213. Thus, when a door actuation signal is received over line 208 to enable gate 210, only one of decision gates 211 or 213 will be enabled since their other inputs sense the position of the door position switch S1. If the door is fully open, AND gate 211 will be disabled and gate 213 enabled thereby setting flip flop 214. The resulting high output on the Q line enables AND gate 217 to close the door. It can be seen that several factors will determine the tripping of comparator 74. If the level of toxic gas is extremely great, capacitor C10 will charge a much faster rate and will exceed the sensitivity threshold level relatively quickly. If the level of gas is at a moderate level it will take capacitor C10 a longer period of time to charge to the threshold level. In either event, persons skilled in the art will realize the toxicity detector 72 serves to allow the system to tolerate a certain amount of toxic gas not dangerous to human health while at the same time ensuring that proper steps are undertaken to counteract a dangerous level of toxic gas. By way of experimentation, it has been determined that toxicity detector 72 will delay the activation of comparator 74 for about 1-3 minutes after sensor element 200 has been subjected to about 3000 parts per million of carbon monoxide gas with the sensitivity threshold level provided by circuitry 76 being 1.7 to 3.7 volts.

After the user has backed out of the garage, he will press the door button 38 on transmitter 12. Free running oscillator 102 (FIG. 5B) consisting of a well known combination of inverters 222, 224, resistors R34, R65 and capacitor C20 provide four cycle per second clock pulses to the clock input of flip flop 226 through gate 104. As noted above, the Q output line 108 is coupled back to pin P10 of receiver 16. When receiver 16 detects a match, gate 104 to the clock input to flip flop 226 will be disabled via inverter 106 thereby keeping the Q output line 108 at a logical one level. The logical one level on line 108 and the "Match" signal on line 105 enables AND gate 112. This in turn enables gate 202 and gate 204 and one input to AND gate 210. Inverter 353 whose output is in a logic high condition enables the other input to AND gate 210 whenever door position switch S1 is either in the full open or full closed position. Gate 210 actuates OR gate 242 and decision gate 213 as previously noted. However, now the position of switch S1 is in the full open position. Accordingly, AND gate 216 is disabled and AND gate 217 is enabled. The enabling of AND gate 217 energizes transistor Q2 and associated relay 221 to activate the motor in the reverse direction to close the door.

According to a feature of this invention maximum run timer circuitry 140 controls the maximum amount of time for the door to close. Circuitry 140 comprises a resistor-capacitor network made up of a resistor R40 and capacitor C21. In this embodiment, within thirty seconds after the energization of AND gate 217, capacitor C21 will charge to the threshold level of OR gate 240. The enabling of OR gate 240 serves to set and reset flip flop 212 and 214 via gates 242 and 244, respectively. Accordingly, AND gate 217 is disabled and AND gate 216 enabled thereby causing the door to reverse in the open direction. This feature of the invention provides a back up mechanism which will prevent injury to persons or property in the event that the commonly used obstruction switch fails.

Figure 5A:
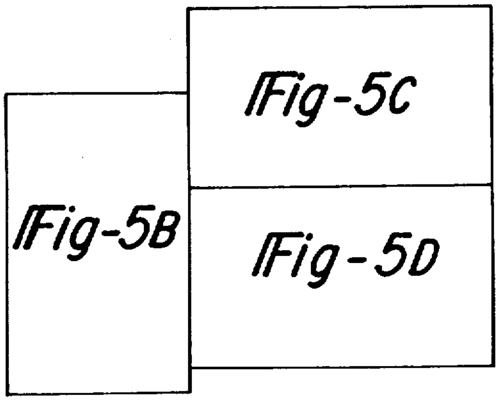
FIGS. 5 (A-D) is a detailed schematic of the circuitry in the central control module, with FIG. 5A illustrating the proper orientation of the drawings to make the interconnection between FIGS. 5B-5D.
Figure 5B:
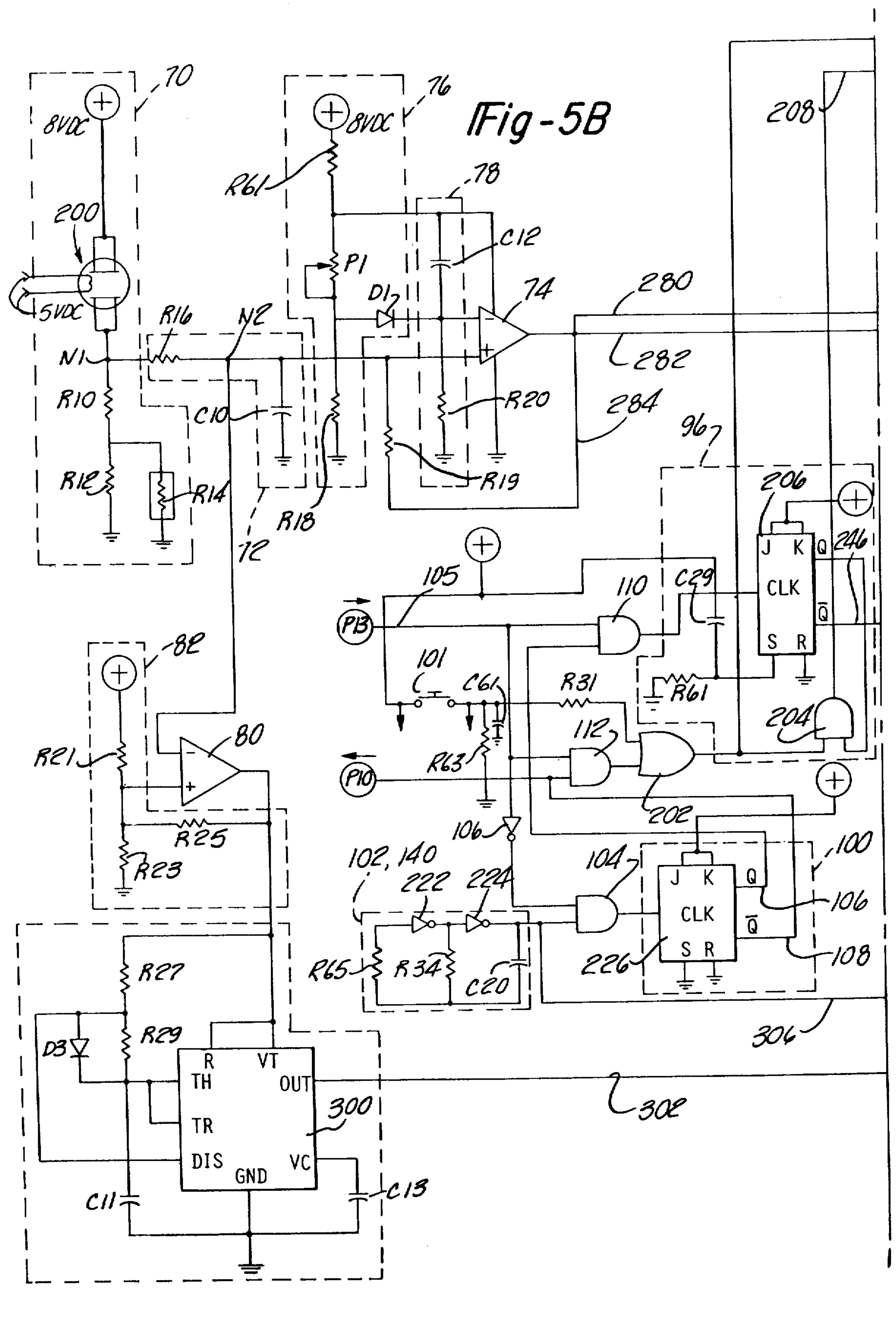
Figure 5C:
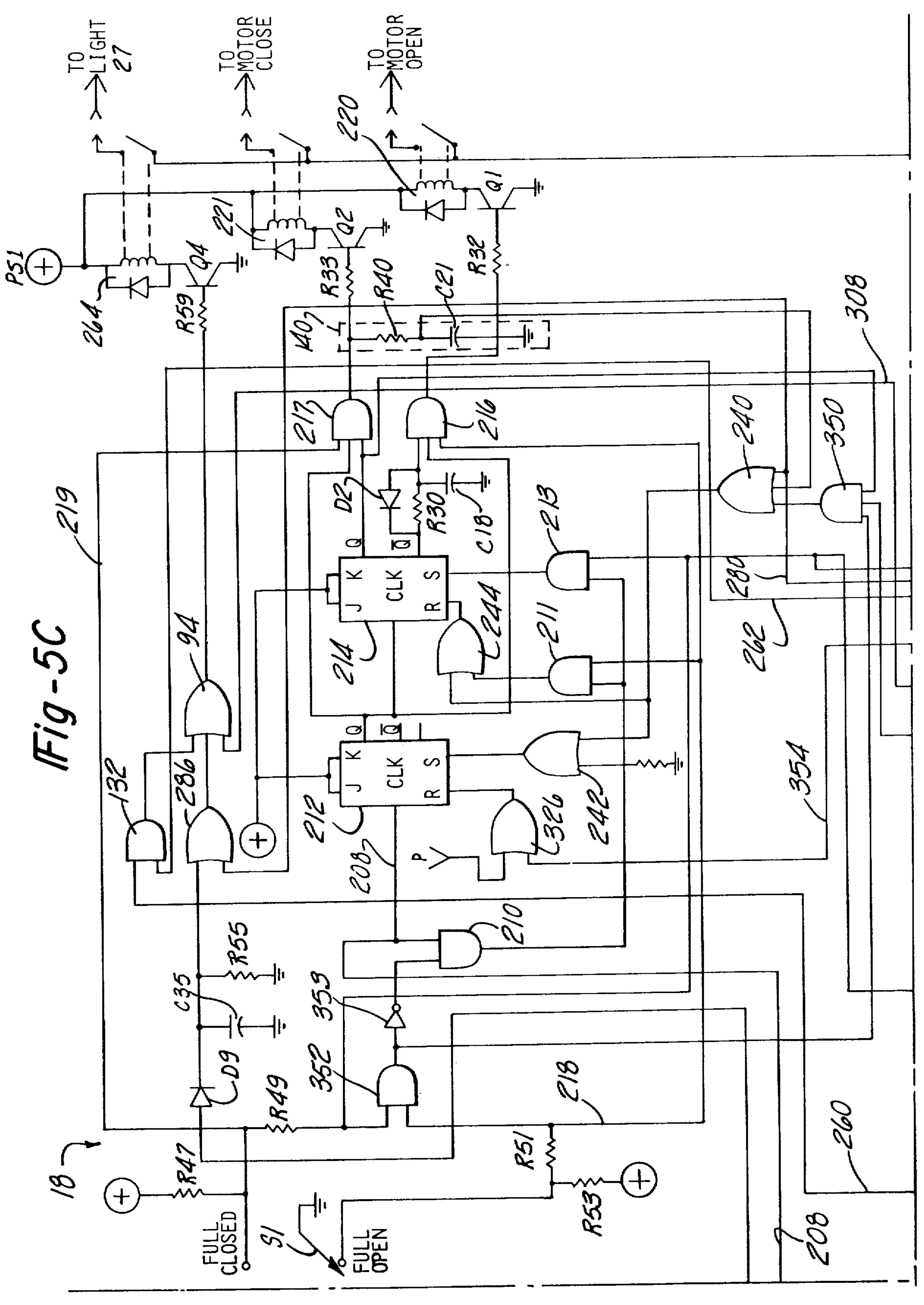
Figure 5D:
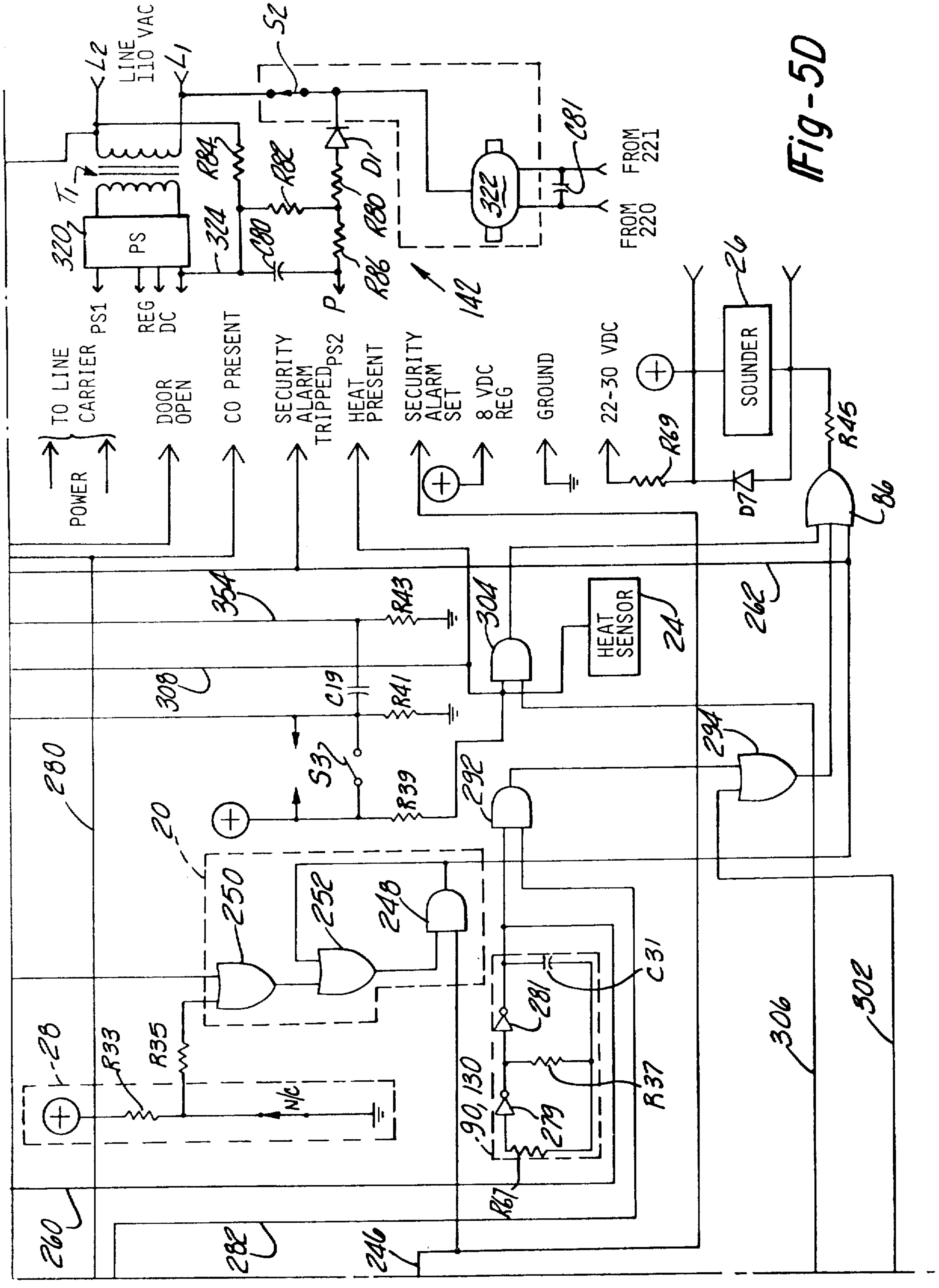

With the door shut, the next thing to do is to press the secure button 36 on transmitter 12. Transmitter 12 will thus generate a pulse train similar to that shown in FIG. 6(A). Assuming the correct security code portions match, receiver 16 will provide an output signal on pin P13 to lock channel monitor flip flop 226 (FIG. 5B) when its Q output on line 108 is at a logical zero level. The logical one level on the Q output of flip flop 226 and the matched signal on 105 causes AND gate 110 to be energized thereby providing a clock signal to flip flop 206. This causes flip flop 205 to change state such that the Q output is at a logical one level and the Q output at a logical zero level. This causes AND gate 204 to be disabled thereby preventing further actuation of the motor control circuitry 18 except by carbon monoxide detector which is capable of overriding the security system lock out. The high logical level of the Q output of flip flop 206 is coupled over line 246 to one input of AND gate 248 (FIG. 5D). Line 246 is also coupled to an input of line carrier 30 to indicate that the security system has been set. This is all that will occur assuming that all of the portal switches 28 and door switch S1 are closed. If, however, either of them indicates that an entrance to the house is open, AND gate 248 will be enabled. OR gate 250 has inputs coupled for receipt of portal switches 28 and door position switch S1. Gate 250 will be enabled if either of these switches are open. An enabled gate 250 will, in turn, enable gate 252 which will cause AND gate 248 to be latched in a continuous enabled state. The enabled AND gate 248 is coupled to OR gate 86 which will turn on transistor Q3 and activate sounder 26. Additionally, a "Security Alarm Tripped" signal will be transmitted by line carrier 30 to remote module 14. The same sequence will occur if any of the portal switches 26 or garage door switch S1 are opened after the security alarm has been set. Additionally, light 27 will be caused to flash at a pulsating one pulse per second rate. This is accomplished by the ANDing of the one cycle per second oscillating network 130 over line 260 with the "Security Alarm Tripped" signal over line 262 at AND gate 132 (FIG. 5C). The pulsating output of AND gate 132 is coupled to OR gate 94 which in turn controls the operation of transistor Q4 which is coupled to light energization relay 264. Accordingly, if the user pushes the secure switch 36 while any of the windows and doors are open in the home, he will be alerted to this fact by flashing lights and an audible signal. The same signal will occur if an intruder opens any of these entranceways. It is important to note that the motor lock out circuitry 96 further prevents the garage door from being opened unless the security alarm subsystem has first been deactivated by again pressing button 36 on the transmitter 12.

In our example, the user later returns home from his trip and first presses the secure button 36 to deactivate the security alarm subsystem as noted above. This will toggle flip flop 206 (FIG. 5B) causing Q line to go low thereby disabling the security alarm system. At the same time, the Q output of flip flop 206 goes to a logical one level. Consequently, when the user subsequently presses door button 38, AND gate 204 will be enabled thereby providing a clock signal over line 208 to flip flop 212 to initiate the garage door opening sequence explained above.

Our user gets out of his car and walks to the door into his home and presses local button 101 to close the garage door as also explained above. Unfortunately, our absent-minded user forgets to turn off the automobile engine. As a result, the sensor element 200 will begin to decrease in resistance thereby charging up capacitor C10 of the toxicity detector 72. When the voltage on capacitor C10 exceeds the threshold level determined by sensitivity reference circuitry 76, comparator 74 will provide a logical high positive output. As a result of the tripping of comparator 74, several things happen. First, the high logic level on line 280 enables OR gate 240 (FIG. 5C) which in turn sets flip flop 212 via gate 242 and resets flip flop 214 via gate 244. Thus, AND gate 216 is enabled thereby turning on transistor Q1 and associated relay 220 to open the garage door. The high level on line 280 is also coupled through OR gate 286 and gate 94 to cause the light 27 to be energized. Line 280 also provides a "CO present" signal to line carrier 30 for transmission to the remote module 14. Secondly, line 282 from comparator 74 (FIG. 5B) is coupled through AND gate 290 and OR gate 294 (FIG. 5D) to cause the sounder 26 to sound at a pulsating one pulse per second rate. Note also that flip flop 212 and 214 remain locked in their states by the continued application of the high signal on line 280 to gate 240. This feature of the invention prevents a user from accidentally shutting the garage door when a dangerous carbon monoxide level is detected. This insures the safety of any remaining occupants in the home.

According to another feature of this invention, provision is made for monitoring the the proper operation of sensor element 200 and its associated power supply. If either of these devices fail the voltage level at node N2 will fall dramatically. Node N2 is coupled to the inverting input of comparator 80. Sensor failure reference circuitry 82 includes a voltage divider network comprised of resistors R21 and R23 which serve in combination with an eight volt regulated DC input to supply approximately a 0.05 volt level to the noninverting input of comparator 80. Thus, when the voltage level at node N2 falls below the sensor failure reference level, comparator 80 will provide a logical high output. The output of comparator 80 is coupled to a commercially available timer 300 such as a component No. 555. The external connections to timer 300 are chosen so that the timer provides an output pulse approximately once every minute. This output signal is carried by line 302 to OR gate 294 (FIG. 5D). The repetitious enabling of OR gate 294 causes sounder 26 to be actuated at a one pulse per minute rate thereby indicating the pending sensor failure to the user.

Heat sensor 24 may be one of several commercially available thermostats which sense the temperature level in the environment. If a predetermined temperature level is exceeded, it will switch states and apply a given voltage level at its output. In such cases, AND gate 304 is enabled at each occurrence of the four cycle per second output pulse from oscillator 102, 140 over line 306. The output of gate 304 is coupled through OR gate 86 to sounder 26 to cause it to be activated at the four cycle per second rate. Additionally, a "Heat Present" signal is supplied to the line carrier 30 and light 27 is activated by way of line 308 which is coupled to OR gate 94 (FIG. 5C).

Pursuant to another aspect of this invention, motor overload protection circuitry 142 is advantageously designed such that only circuitry controlling power to the motor relays 220 and 221 is removed from the system thereby keeping the various sensors and associated control logic is a fully operational state. Referring to FIG. 5D, 110 volt line voltage is supplied over lines L1 and L2 through transformer T1 to a power supply network 320 of conventional design which provides a variety of regulated or nonregulated DC output levels to control various circuit components. As is known in the art, typical AC motors such as door actuator motor 322 includes a motor overload switch S2. Motor overload switch S2 is generally a bimetallic switch which will open when motor 322 heats beyond a predetermined temperature thereby preventing damage to the motor. The direction of motor 322 operation is controlled by motor control relays 220 and 221 thereby determining whether the garage door will be moved in the opened or closed direction.

Under normal operating conditions motor overload switch S2 will be in the closed position. When in this state, the line voltage over lines L1 and L2 is halfwave rectified by the operation of diode D1 and a voltage divider network consisting of resistors R80, R82, R84, R86 and capacitor C80. The voltage divider network is also coupled to an eight volt regulated DC out on line 324 from power supply 320. If the motor overload switch S2 is closed, the rectified line voltage will be subtracted from the DC voltage on line 324. This will maintain the output labled P at a relatively low voltage level corresponding with a logical zero or low level. Point P is coupled to one input of OR gate 326 (FIG. 5C). The output of gate 326 is tied to the reset input of motor control flip flop 212. Thus, as long as motor overload switch S2 is closed, flip flop 212 can function normally as noted above. If, however, switch S2 opens, due to an excessive motor heat condition, the voltage drops across the voltage divider network from the 110 volt line voltage would be lost. Consequently, the voltage at point P will rise and change its logical significance from a logical low to a logical high condition. The logical high condition at point P causes OR gate 326 to be enabled thereby resetting motor control flip flop 212. This effectively locks motor control circuitry 18 into a wait or disabled condition. It is important to note that only the motor control functions are disabled once motor overload switch S2 is opened. All other logic sections, i.e. the security alarm 20, carbon monoxide sensor 22, heat sensor 24, light 27, etc. remain active regardless of the state of motor overload switch S2. While reset, the Q output of flip flop 212 will remain at a low level such that both of gates 216 and 217 are disabled. Consequently, neither motor relay 220 or 221 can be activated thereby preventing further positioning of the garage door.

Once normal operating conditions are detected, motor overload switch S2 will again close. The closing of switch S2 will change the logic level at point P to a logic low condition again thereby re-enabling motor control flip flop 212 via the disabling of OR gate 326. It is important to note that any interim attempt to activate motor control circuitry 18 via an appropriate signal on control line 208 of flip flop 212 will not change its Q output to a logic high condition as long as motor overload switch S2 is open. Also, any previous settings of the motor control logic 18 will be cancelled out when flip flop 212 is reset. This prevents the garage door from being activated as soon as the motor 322 recovers. Instead, further door activation will only be obtained by the subsequent generation of appropriate signals by the system after motor overload switch S2 resumes its normally closed position.

The motor control circuitry also includes provision of an obstruction switch S3 (FIG. 5D) which when tripped causes the closing garage door to stop, then reverse direction. Briefly, this is accomplished by the operation of AND gate 350 (FIG. 5C). Once input of AND gate 350 is from the Q output of flip flop 214 which will be high if the door is closing. Another input is from gate 352 which will be high if the door is neither fully closed. The other input is from obstruction switch S3 which, when tripped, will pull the other input to AND gate 350 high thereby enabling it and OR gate 240. This resets flip flop 214 via gate 244 and sets flip flop 212 via gate 242. This causes the garage door to begin opening after the 100 millisecond delay noted herein. Capacitor C19 coupled to obstruction switch S3 generates a very short pulse on line 354 which is coupled back to gate 326 to the reset input of flip flop 212. If the door is opening, the Q output of flip flop 214 will be low thereby disabling gate 350. If an obstruction is occured while the door is opening the pulse on line 354 causes the Q output of flip flop 212 to go low thereby disabling gate 216 to prevent further opening of the door.

In view of the foregoing it can now be realized that the present invention provides a unique combination of a home security system and an automatic garage door operator. While the preferred embodiment has been described in connection with a unitary system, it is readily envisioned that add-on modules can be utilized to retrofit existing garage door operators. Further, a variety of environmental sensors could be additionally utilized if desired. Although one remote module 14 is disclosed in the prefered embodiment, it should be readily apparent that a variety of remote modules can be located at various locations within the home. Therefore, while this invention has been described in connection with particular examples thereof, no limitation is intended thereby except as defined in the appended claims.

The embodiments of the invention in which an exclusive property or privilege is claimed are defined as follows:

1. In a garage door operator of the type having a door drive motor, an overload switch for the motor, an integrated security alarm system, and a power supply normally connected to both the motor and the alarm system, the improvement comprising:

circuit means interconnecting the power supply, the motor, the overload switch and the alarm system including detector means for monitoring the condition of the overload switch and providing a first logical signal level to the motor and to the alarm system to maintain normal operation thereof but responsive to the opening of said overload switch to provide a second logical signal level which selectively disables only the motor.

* * * * *